March 7, 1961 R. PETH 2,974,221

SQUELCH CIRCUIT

Filed Jan. 14, 1957 3 Sheets-Sheet 1

INVENTOR.
Robert Peth
BY Mueller & Aichele
Attys.

March 7, 1961 R. PETH 2,974,221

SQUELCH CIRCUIT

Filed Jan. 14, 1957 3 Sheets-Sheet 2

INVENTOR.
Robert Peth
BY Mueller & Aichele

Attys.

March 7, 1961 R. PETH 2,974,221

SQUELCH CIRCUIT

Filed Jan. 14, 1957 3 Sheets-Sheet 3

INVENTOR.
Robert Peth
BY Mueller & Aichele
Attys.

United States Patent Office 2,974,221

Patented Mar. 7, 1961

2,974,221

SQUELCH CIRCUIT

Robert Peth, Chicago, Ill., assignor to Motorola, Inc., Chicago, Ill., a corporation of Illinois Filed Jan. 14, 1957, Ser. No. 634,087

5 Claims. (Cl. 250—6)

This invention relates to two-way communication systems and more particularly to squelch circuits for such systems which utilize a code tone for selective calling of stations in the system.

In my copending application Serial No. 555,364, filed December 27, 1955, now abandoned, there is described and claimed a communication system in which stations may be selectively called by signals from a given transmitter which transmits a tone of particular frequency as continuous modulation of the carrier. The receivers which are to be called by such a transmitter include a squelch circuit which is opened to render the receiver responsive only so long as the tone is received. In a tone operated squelch system it is highly advantageous to use carefully controlled tone signals of given frequency such as may be provided by resonant reed devices. Thus, the transmitted carrier can be modulated by a tone outside of the usual modulation range which is closely regulated by a vibratory reed. The receiver squelch would then open when the demodulated signal received thereby actuates a vibratory reed which is resonant at the frequency of this tone. Such a system, generally employing angular modulation equipment (as used herein angular modulation indicates both frequency and phase modulation), can provide a high degree of reliability and security in a system which uses numerous tone frequencies so that many selective calling combinations are possible.

It has been found, however, that resonant reed devices in the receivers may tend to continue vibrating for a short period after a transmission has ceased. Since vibration of the reed device maintains the squelch circuit open and an angular modulation receiver produces noise when no carrier is translated, a short blast of high level background noise is emitted from the receiver at the termination of each transmission. This "squelch tail" may be of the order of ⅓ of a second and could prove to be annoying to an operator during use of the equipment.

Accordingly, it is an object of the present invention to provide a two-way communication system wherein a reduced amount of noise is produced by the receivers at the ends of the transmissions received thereby.

Another object is to provide an improved and fast acting selective calling system for two-way communication equipment.

Still another object is to provide tone coded squelch apparatus for multi-station two-way radio apparatus using resonant reed devices to respond to the code tone and which squelch apparatus is constructed to reduce the inertia effects of the reed devices at the ends of each transmission.

A feature of the invention is the provision of a selective calling communication system in which a tone coded carrier signal is used to hold open the squelch circuit in selected receivers and wherein cut-off of the carrier signal is delayed at the end of each transmission to provide a carrier signal for quieting the receivers during the time necessary for the squelch circuit to close and silence the audio frequency system of the receiver.

Another feature is the provision of a selective calling frequency modulation communication system which uses a tone coded carrier to hold open the squelch circuit of a called station receiver, with the receivers of the system employing resonant reed devices responsive to the code tone, and the transmitter automatically sending a tone modulated carrier of the proper phase to damp the reed devices in the receivers to close the squelch circuit quickly and silently as the transmission ceases.

Further objects, features and the attending advantages of the invention will be apparent upon consideration of the following description and drawings in which.

In practicing the invention there is provided a two-way communication system wherein selective calling of certain stations is obtained by transmission of a carrier which is continuously modulated by a code tone, which tone is outside the frequency range of the modulation used to relay other information in the system. The receivers have tone responsive squelch circuits using resonant reed devices which are operated by the code tone to open their respective squelch circuits. As the transmission ceases, the usual tone modulation is discontinued immediately, but cessation of the carrier signal is delayed for a fraction of a second so that the carrier signal will continue for the duration of vibration of the receiver reed devices, thereby reducing background noise which might be heard if the squelch circuit were open and no carrier signal were being received. To promote rapid damping of the receiver reed devices, the same code tone, but of different phase, may be applied to modulate the delayed carrier so that this tone damps the receiver resonant reeds and closes the squelch circuits more quickly.

Figure 1:
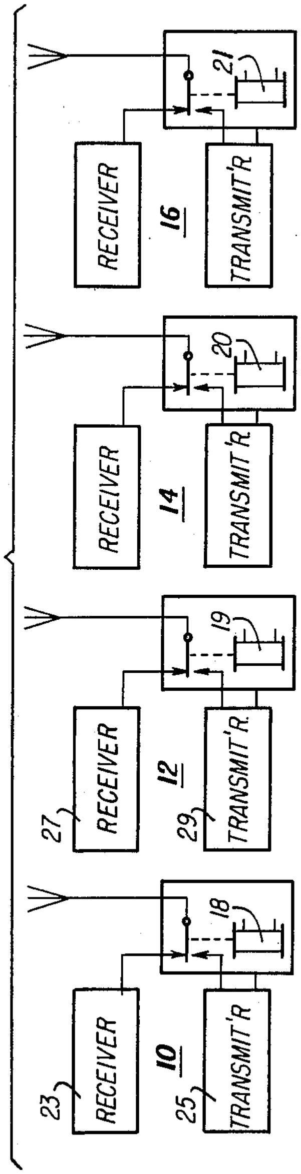
Fig. 1 is a block diagram of a communication system showing four two-way stations.

Fig. 1 shows two-way communication stations 10, 12, 14 and 16 which all operate on the same carrier frequency. Each station includes relay means 18, 19, 20 and 21, respectively, which operatively couple either the station receiver or transmitter to an associated antenna. The invention will be described in connection with receiver 23 and transmitter 25 of station 10, and receiver 27 and transmitter 29 of station 12, although it will be obvious that more than one receiver may be selectively called by transmitter 25, and that by using code tones of other frequencies many different selective calling combinations may be provided.

Figure 2:
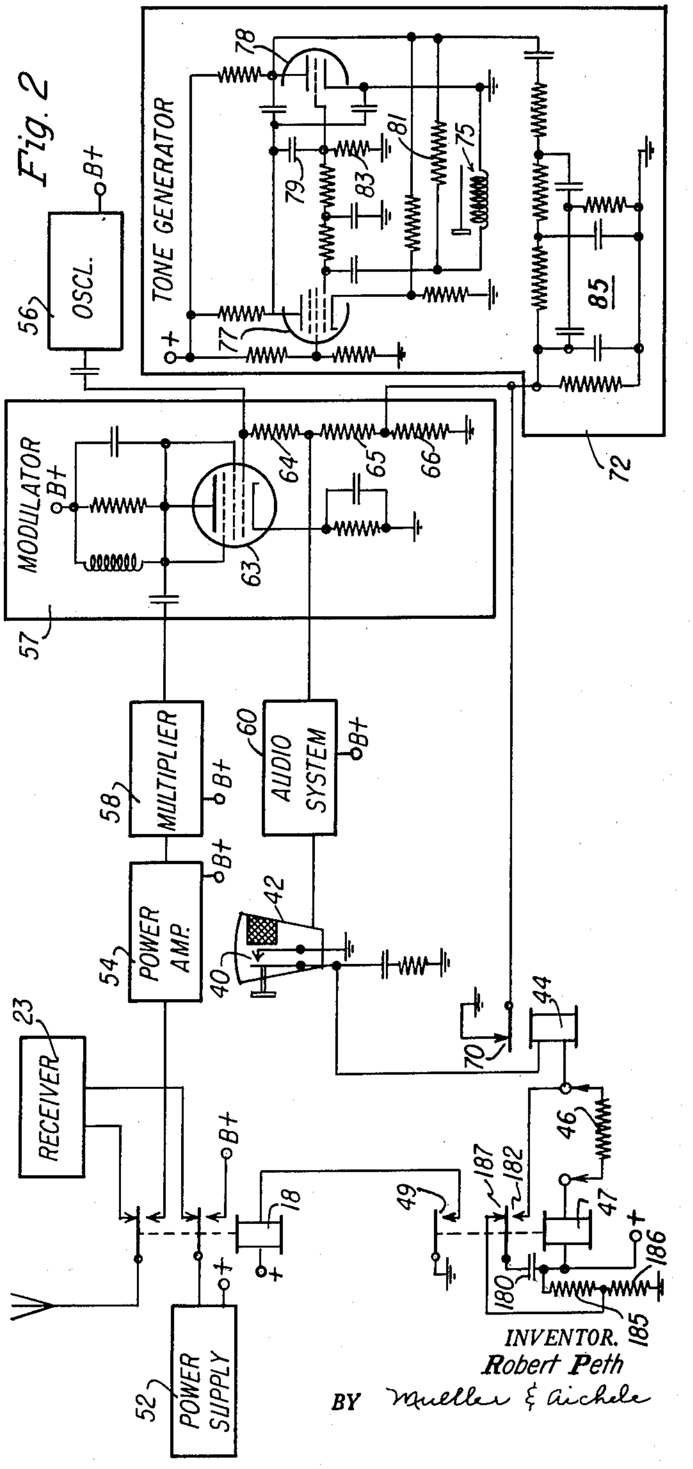
Fig. 2 is a diagram of one two-way station showing its transmitter in some detail.

Considering generally the operation of station 10 as shown in Fig. 2, it may be noted that closing of push-to-talk switch 40 on microphone 42 will ground one side of relay 44, the other side of which is coupled through resistor 46 and relay 47 to a positive potential. Thus, relay 44 and 47 will be energized and contacts 49 of relay 47 will be closed to complete a circuit for relay 18, in the energized condition of which power supply 52 is connected to the B-plus circuits of the transmitter and the antenna is connected to power amplifier 54. Signals are applied to power amplifier 54 from the oscillator 56 and through modulator 57 and frequency multiplier 58. Multiplier 58 raises the frequency of the signal from oscillator 56 to provide a carrier signal of desired frequency which may be of the order of 160 megacycles. Modulator 57 provides angular modulation of the signal from oscillator 56 according to audio signals applied thereto from microphone 42 through the audio system 60 and from the tone generator. Audio signals are applied to the grid of modulator tube 63 in modulator 57 through portions of a resistor network including resistors 64, 65 and 66 which are connected between the control grid and ground.

When the push-to-talk switch 40 is operated and relay 44 is energized, contacts 70 thereof open and remove ground from the junction of resistors 65 and 66 so that a tone from oscillator 72 is applied to the control grid of modulator tubes 63 through resistors 64 and 65. The tone signal from the oscillator or tone generator 72 may be of the order of 100–200 cycles per second which is outside of the frequency range of the modulating signals usually translated in a two-way communication system. A vibratory resonant reed device 75 is used in oscillator 72 for accurate control of the code tone. Since this device is of very high Q and cannot be readily keyed without a starting delay, circuit 72 is operative at all times and contacts 70, when opened, permit application of the tone to the modulator 57. As the reed of device 75 vibrates, the coil thereof acts like a tuned circuit and supplies a signal to the grid of tube 77. This signal is amplified thereby and applied to the grid of tube 78 through capacitor 79. The signal is further amplified in tube 78 and applied through resistor 81 to the grid of tube 77, thereby providing feedback to sustain oscillation. The signal at the grid of tube 78 is made large enough to draw a grid current thus developing a negative bias across resistor 83. This bias acts as a gain control signal for tube 77 to stabilize the oscillator and reduce distortion. The output signal is derived from the anode of tube 78 and is passed through a harmonic filter network 85 to be applied to the grid of modulator tube 63.

Accordingly, it may be seen that when the push-to-talk switch 40 is operated the transmitter will provide a carrier wave which is continuously modulated with a tone from generator 72 and which may be further modulated with audio signals from the microphone 42.

Figure 3:
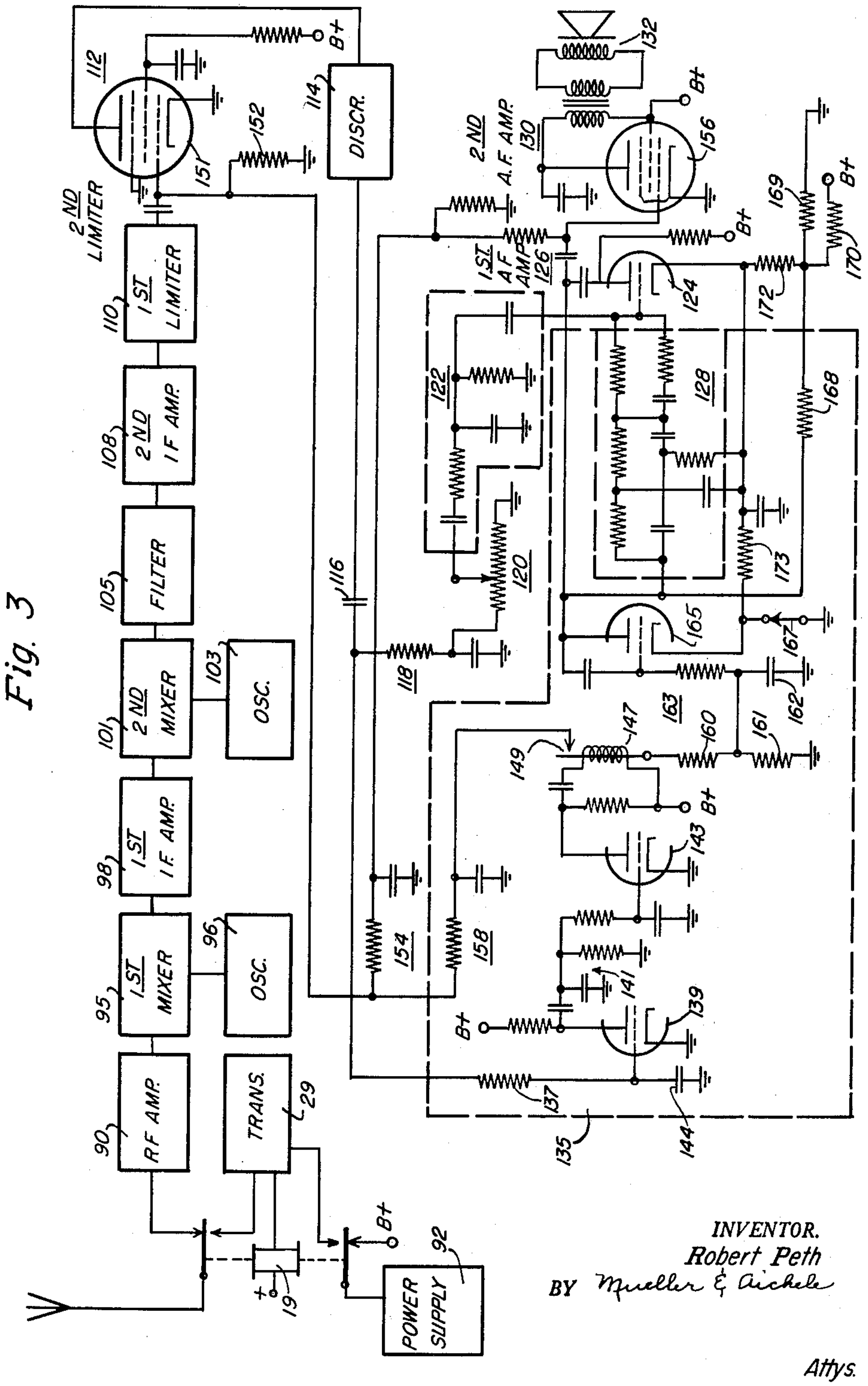
Fig. 3 is a diagram of a station showing its receiver in some detail.

Fig. 3 shows station 12 in greater detail and it may be noted that in the unenergized condition of relay 19, transmitter 29 is not operative but that the contacts of this relay couple radio frequency amplifier 90 to the antenna and apply B+ to the receiver from power supply 92. The received signal is heterodyned in the first mixer 95 which is also coupled to an associated oscillator 96 to provide a signal for the first intermediate frequency amplifier 98. The signal is then further heterodyned by second mixer 101, which is coupled to an associated oscillator 103, and then the signal is applied to a filter, or series of tuned circuits, 105 to obtain selectivity in the receiver. The signal is further amplified by the second intermediate frequency amplifier 108 and applied to first limiter stage 110 and second limiter stage 112. Stages 110 and 112 provide well-known amplitude limiting of the angular modulation signal from transmitter 25. The output of second limiter 112 is applied to the discriminator 114 to derive modulation of the received carrier wave. This modulation includes the code tone signal as well as the audio signals from microphone 42.

The demodulated audio signals from discriminator 114 are applied through capacitor 116 to an RC compensating network 118 to provide a proper frequency relationship among the components of the audio signal as commonly required in an angular modulation system. The signal is then coupled to volume control 120 which may be adjusted to apply a portion of the signal through a shaping network 122 to the control grid of tube 124 in first audio amplifier 126.

Network 122 is designed to greatly attenuate low frequency audio signals below approximately 300 cycles in order to prevent the code tone from being translated by amplifier 126. A further filter network 128, in the form of a parallel-T filter is coupled to the anode, cathode and control grid of tube 124. This network includes resistor and capacitor elements which together are resonant at a frequency of approximately 350 cycles per second. Accordingly, network 128 in conjunction with compensating network 118 and shaping network 122 cause amplifier 126 to respond to audio signals above 300 cycles per second, while signals below this frequency are substantially cut off. These signals thus translated by amplifier 126 are applied to the second audio frequency amplifier 130 and after further amplification therein the audio signal is coupled to speaker 132 or any other suitable utilization means.

The receiver also includes a squelch control circuit 135 which regulates the conduction of tube 124 in the first audio frequency amplifier by applying or removing a cut-off bias potential to the control grid. The demodulated audio signals are applied to squelch circuit 135 by way of coupling capacitor 116 and resistor 137. These signals are amplified by tube 139, filtered by network 141 and fed to the control grid of tube 143. Capacitor 144 connected between the control grid of tube 139 and ground, together with low-pass filter network 141 provide attenuation of the voice audio signals and essentially allow only the audio tones below 300 cycles per second to reach tube 143. The output of tube 143 is coupled to vibratory resonant reed device 147 and this device is made resonant to the coded squelch tone regulated by reed device 75 at the transmitter (Fig. 2). It may be noted that a vibratory arm of device 147 will be set in motion upon reception of the code tone to alternately open and close contacts 149. Upon reception of a carrier signal the control grid of tube 151 in the second limiter 112 will draw grid current through resistor 152 and this voltage is applied by way of RC filter 154 to the control grid of tube 156 in the second audio frequency amplifier 130 thereby furnishing a bias for this tube. Furthermore, the negative voltage is coupled through filter 158 and contacts 149 to series-connected resistors 160 and 161.

The portion of this negative voltage appearing across resistor 161 is filtered by capacitor 162 and applied through resistor 163 to the control grid of tube 165. The cathode of this tube is normally grounded through switch 167 and the anode thereof is coupled through resistor 168 to a voltage divider comprising resistors 169 and 170 coupled between ground and B+. Tube 165, normally conductive with its grid grounded through resistors 161 and 163, is cut off or rendered non-conductive whenever reed device 147 is operated and the negative voltage from the second limiter 112 is applied to the control grid. When tube 165 is thus cut off, the potential at its anode rises to the potential existing at the junction of resistors 169 and 170. The junction of these resistors is coupled through resistor 168 and a D.C. path in filter network 128 to the control grid of tube 124 in the first audio amplifier 126. The cathode of tube 124 is returned through resistor 172 to the junction of resistors 169 and 170 and to ground through resistor 173 and switch 167. The values of the various circuit components and voltages are selected so that the tube 124 will conduct when tube 165 is cut off. Therefore, when the code tone is received to operate reed device 147, tube 124, which is otherwise cut off or rendered non-conductive by conduction of tube 165, will be conductive (the squelch circuit will be opened) and amplifier stages 126 and 130 will translate the demodulated signal appearing across a portion of volume control 120 so that it is heard from speaker 132. As previously pointed out the code tone will be removed by filter 122. Obviously, the receiver in Fig. 3 will respond only when the code tone to which reed device 147 is tuned, is received.

Switch 167 is included in the cathode circuit of tube 165 so that the tone operated squelch system may be disabled to enable the receiver to respond to all signals to which it is tuned regardless of whether the code tone is included therewith. When switch 167 is opened, tube 124 is conductive and the anode and cathode of tube 165 are coupled across resistor 172, with the cathode thereof more positive than the anode, so that tube 165 remains cut off.

It may be noted that audio tones of the order of 100–200 cycles per second are used to operate the tone coded squelch circuit 135 and that at such frequencies vibratory reed devices can be made highly selective. Therefore, many groups of stations may be included in the system of Fig. 1 and all may operate on the same carrier wave frequency while selective calling among the stations is effected by merely using reed devices of different response frequencies. It has been found that low frequencies of the order of 100–200 cycles per second are particularly effective in an angular modulation system because the squelch circuit may open even when the received carrier wave is of comparatively low strength. Obviously more than one reed device may be used in a transmitter or receiver so that any selective calling combinations are possible.

It may be noted that the vibratory reed of device 147 which opens and closes contacts 149 will have a certain finite size and weight and will therefore be subject to the effects of inertia. That is, once it is set in motion, it will continue to vibrate for a certain period even when the energizing tone has been removed. Thus, at the end of each transmission when the code tone and the transmitter carrier are no longer received contacts 149 may be alternately opened and closed for a period of up to one-third of a second which would keep the receiver squelch open for that time. With no carrier being received, the receiver would no longer be in a quieting condition and a short blast of noise would be emitted by the speaker. In the transmitter shown in Fig. 2 this is overcome by delaying the release of relays 47 and 18 to maintain transmission of the carrier as the reed of device 147 ceases to vibrate.

To provide this operation and maintain the receiver in a quieting condition since the carrier is being received with the squelch thereof opened, the following delay circuit is incorporated in the transmitter of Fig. 2. When push-to-talk switch 40 is opened, relay 44 is deenergized and contacts 70 are closed to ground the output of tone generator 72, so that resistor 66 is shorted and no tone will be applied to modulator tube 63. During the time relays 44 and 47 were energized, capacitor 180 remained charged through contacts 182 to the potential existing across relay 47 and resistor 46. When switch 40 has opened, charged capacitor 180 will maintain contacts 49 closed and relay 18 energized as it discharges, so that the carrier continues to be transmitted. When capacitor 180 discharges through resistor 46 and relay 47, this relay will release and relay 18 will release to stop transmission of the carrier. At this time a charge is maintained on capacitor 180 since the capacitor is connected across resistor 185 in voltage divider 185, 186 by contacts 187 of relay 47. This improves the system for rapid repeated use of the transmitter since capacitor 180 will have some charge when switch 40 is operated. Resistor 46 may be of a selected value to provide a desired delay in stopping the carrier so that the reed of device 147 in the receiver may come to rest and close the squelch of the receiver. Accordingly, by this carrier release delay system the blast of noise ordinarily emitted by the receiver due to inertia effects of reed device 147 will be overcome.

Figures 4, 5:
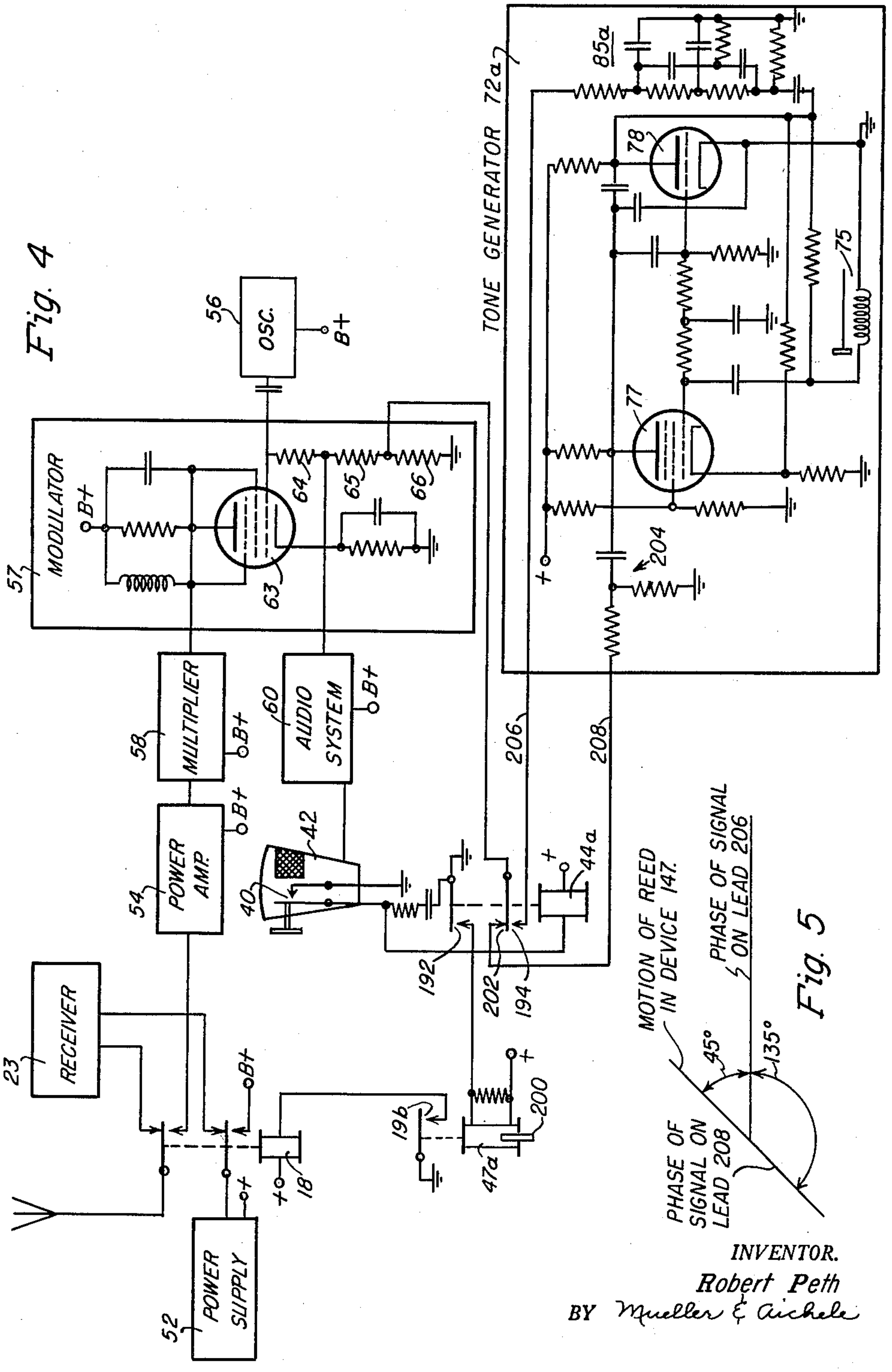
Fig. 4 is a diagram showing a modified form of the transmitter of Fig. 2.
Fig. 5 is a diagram useful in explaining the circuit of Fig. 4.

In the transmitter of Fig. 4, components corresponding generally to those of the transmitter of Fig. 2 are given the same reference characters. In this circuit, by closing push-to-talk switch 40, relay 44*a* is directly energized to close contacts 192 and energize relay 47*a*. Contacts 194 are also closed and these apply a signal from tone generator 72*a* to the control grid of modulator tube 63. With relay 47*a* energized, contacts 196 thereof close to energize relay 18 and render the transmitter operative so that the carrier is transmitted.

Tone generator 72*a* corresonds generally with tone generator 72 of Fig. 2 and, in the operated condition of push-to-talk switch 40, the output of the generator is derived from the anode of tube 78 through harmonic filter 85*a*. However, when switch 40 is released, contacts 192 will open and remove the operating potential from relay 47*a* which includes a slug 200 so that this relay is slow to release and opening of contacts 196 is delayed for a period of approximately 120 milliseconds. This maintains transmission of the carrier for that period. As soon as switch 40 is released, contacts 194 are opened and contacts 202 are closed which applies a tone from the anode of tube 77 to the control grid of modulator tube 63. The tone applied to contacts 202 is coupled from the anode of tube 77 by way of RC network 204. It is contemplated that the tone thus applied to the modulator when switch 40 is released be of the proper phase to damp the vibration of the reed device in the receiver in order to bring it to rest quickly. It may be noted that a tone of this phase will continually be applied to modulator 57 but that when the delay time of relay 47*a* has elapsed, relay 18 will be deenergized and the transmitter will not be operative.

Proper phasing of the signal to cause damping of the receiver vibratory reed device may be provided as shown in Fig. 5. It can be established that vibratory reed devices such as device 147 generally operate with the vibrating arm lagging the applied voltage approximately 45°. Accordingly, when the tone of reverse phase is applied to modulator 57 through lead 208, the signal should lead the previously applied tone by approximately 135°, so that the damping code tone will be 180° out of phase with respect to the motion of the vibrating arm of device 147. This will cause much more rapid closing of the squelch at the receiver and the time may be reduced to the order of 120 milliseconds to obtain closing of the squelch circuit. Thus, it is only necessary that the release of relay 47*a* to provide transmission of the carrier and the damping tone code of reverse phase be of the order of 1/10 to 1/5 of a second. It may be noted that the carrier of the transmitter will be received by the receiver during this period so that quieting action may take place while the reed device therein is being damped. The necessary 135 degree phase difference of signals in leads 206 and 208 is obtained by proper selection of constants in networks 85*a* and 204.

The invention provides therefore a two-way selective calling communication system which operates more quietly at the termination of each transmission. Provision is made to facilitate faster communication among stations of the system while at the same time operators of the equipment are not subjected to unnecessary noise during use of the apparatus.

I claim:

1. In a selective calling communication system including a wave signal receiver having a squelch circuit adapted to be opened upon reception of a carrier wave modulated by a tone of given frequency, which squelch circuit is operated by a resonant reed device subject to continuing vibration for a given period upon termination of energization thereof, a transmitter for said system including means for generating a carrier wave, modulating means for modulating the carrier wave with intelligence, tone generator means providing audio frequency tones of the given frequency including a first tone of a phase for operating the reed device with given motion and a second tone of a phase for damping said motion, first relay means having first and second contacts, said first relay means being operable to apply said first tone to said modulating means and being releasable to apply said second tone to said modulating means, second relay means having third contacts for energizing said transmitter so that the carrier wave is transmitted, said second relay means including means for causing delayed release of said third contacts for a given period after deenergization thereof, and switch means operable to energize said first and second relay means for selective calling of the receiver and releasable to deenergize said first and second relay means with the delayed release of said third contacts providing transmission of the carrier wave for said given period modulated by said second tone, so that the carrier wave may be translated by the receiver to cause quieting thereof during damping of the reed device.

2. In a selective calling communication system wherein a wave signal transmitter is operative on a given frequency channel and wherein a wave signal receiver of a plurality of such receivers may be rendered responsive to signals from the transmitter, the combination including a receiver having a tone responsive squelch circuit adapted to be opened upon reception of a carrier modulated by a code tone of particular frequency, said squelch circuit including a vibratory resonant reed device actuated by the code tone for opening said squelch circuit, said reed device being subject to continuing vibration for a given period upon removal of the energization thereof, and a transmitter having means for generating a carrier wave, modulating means for modulating the carrier wave with voice intelligence, tone generator means providing first and second audio frequency tones of the particular frequency, said first tone being of a given phase to cause energization of said reed device and vibratory motion therein, said second tone being of a different phase to cause damping of said vibratory motion, first relay means energizable to apply said first tone to said modulating means and releasable to apply said second tone to said modulating means, said first relay means being releasable in less than said given period upon deenergization thereof, second relay means for energizing said transmitter so that a carrier wave is transmitted, said second relay means having delay means associated therewith for delaying release thereof during said vibratory motion, and a microphone for said modulating means including a push-to-talk switch for energizing said first and second relay means, whereby release of said push-to-talk switch provides the carrier wave modulated by said second tone during the continuing vibration of said reed device for damping thereof and closing of said squelch circuit.

3. In a communication system including a wave signal receiver having a squelch circuit adapted to be opened upon reception of a signal of given frequency, which squelch circuit is operated by vibrator means slow to release upon termination of the energization thereof, a transmitter for said system including a source of intelligence signals to be transmitted, switch means operable to a first position for transmission of the intelligence signals and to a second position for disabling said source of intelligence signals, signal generator means providing a signal of the given frequency including a first signal component having a phase for operating said vibrator means and a second signal component of a phase for damping said vibrator means, and circuit means connecting said signal generator means to said switch means for transmission of the first signal component in the first position of said switch means and transmission of the second signal component in the second position of said switch means so that the squelch circuit is opened upon transmission of the intelligence signal and closed in the absence of the intelligence signal.

4. In a selective calling communication system including a wave signal receiver having a squelch circuit adapted to be opened upon reception of a control signal of a given frequency, which squelch circuit is operated by resonant means which is slow to become deenergized on termination of the control signal to which it responds; a transmitter for said system including a source of intelligence signals to be transmitted, switch means operable to a first condition for transmission of the intelligence signals and to a second condition for disabling said source of intelligence signals, said switch further being momentarily operative through an intermediate condition upon operation from said first condition to said second condition thereof, signal generator means providing a control signal of the given frequency including a first signal component having a phase for energizing said resonant means and a second signal component having a phase for deenergizing said resonant means, and circuit means connecting said signal generator means to said switch means for transmission of the first signal component in said first condition of said switch means and transmission of the second signal component in said intermediate condition of said switch means so that said squelch circuit is opened upon operation of said switch means to said first condition for transmission of the intelligence signals and rapidly closed upon operation of said switch means through said intermediate condition.

5. A selective calling communication system including in combination, a wave signal receiver for a communication signal, said receiver having a squelch circuit operative by tuned means responsive to a control signal of given frequency and first phase for unsquelching said receiver and responsive to the control signal of given frequency and second phase for squelching the receiver; and a transmitter including means to provide a carrier wave, modulator means for modulating the carrier wave by intelligence signals, a signal generator operative to produce the control signal of given frequency and of the first and second phases, and switch means for controlling transmission of the modulated carrier wave by said transmitter and for selectively applying from said signal generator to said modulator means the control signal of first phase upon transmission of the intelligence signals and the control signal of second phase upon termination of transmission of the intelligence signals for rapidly squelching said receiver upon termination of transmission of the intelligence signals.

References Cited in the file of this patent

UNITED STATES PATENTS

| | | |
|---|---|---|
| 2,044,519 | Usselman | June 16, 1936 |
| 2,134,562 | Kimmich | Oct. 25, 1938 |
| 2,527,561 | Mayle | Oct. 31, 1950 |
| 2,671,166 | O'Brien | Mar. 2, 1954 |